United States Patent [19]

Drucker et al.

[11] Patent Number: 6,049,805
[45] Date of Patent: Apr. 11, 2000

[54] DYNAMIC EVENT MECHANISM FOR OBJECTS WITH ASSOCIATIONAL RELATIONSHIPS

[75] Inventors: Steven M. Drucker, Bellevue; Kirk J. Marple, Redmond; Don P. Mitchell; Manny Vellon, both of Bellevue, all of Wash.

[73] Assignee: Microsoft Corporation, Redmond, Wash.

[21] Appl. No.: 09/028,544

[22] Filed: Feb. 24, 1998

[51] Int. Cl.[7] ........................................ H04J 3/02
[52] U.S. Cl. ...................... 707/102; 707/1; 600/322; 600/316; 600/474; 600/483
[58] Field of Search .................... 707/1, 102; 379/68, 379/88.04, 88.22, 167, 201, 211; 709/229; 345/173, 302, 351; 455/445; 370/40; 340/313, 825.31; 714/11; 248/176.1; 600/300; 380/49; 434/38

[56] References Cited

U.S. PATENT DOCUMENTS

| | | | |
|---|---|---|---|
| 5,652,789 | 7/1997 | Miner | 379/201 |
| 5,764,639 | 6/1998 | Staples | 370/401 |
| 5,776,057 | 7/1998 | Swenson | 600/301 |
| 5,808,612 | 9/1998 | Merrick | 345/351 |

*Primary Examiner*—Wayne Amsbury
*Assistant Examiner*—Diane Mizrahi
*Attorney, Agent, or Firm*—Ipsolon LLP

[57] ABSTRACT

A dynamic or latebound event mechanism provides event mechanism operation according to associational relationships among objects. In addition, objects may be responsive to event notification methods that are not initially within the original object definition, thereby allowing the event notification methods to be inherited by objects dynamically during run-time. One implementation utilizes the associations Self, Contents, and Peer for objects representing entities in a virtual world environment. Event notifications methods are promulgated among the objects corresponding to the entities in a sequence based upon the associational relationships between the entities.

31 Claims, 6 Drawing Sheets

DYNAMIC EVENT MECHANISM FOR OBJECTS WITH ASSOCIATIONAL RELATIONSHIPS

FIELD OF THE INVENTION

The present invention relates to interfaced software objects and, in particular, to a latebound notification of event notification methods among the interfaces, which notification includes handling of event methods directly or indirectly at the interfaces.

BACKGROUND AND SUMMARY OF THE INVENTION

A conventional interfaced software object provides software services, such as methods or properties, that are accessed by one or more interfaces. A method is typically a function or procedure that performs a specific action and is called via a corresponding interface. A property is typically information or data and is also called via a corresponding interface. Objects are commonly implemented in a server that, for example, may be a dynamic link library utilized by a software program or may be an entirely separate executable process.

Conventional objects include the characteristic of interface inheritance in which the definitions of the methods that an interface supports may be inherited by another interface. The interfaces may be of different objects that may or may not be of the same class of objects. An object supporting an inherited interface can be treated like the object from which the interface is inherited. Such objects may be implemented by or in accordance with many object-oriented programming tools or models including, for example, the component object model (COM).

An interface of an object may not be changed once the design and implementation of the interface is complete and the object is established, distributed, or promulgated for general run-time use. Adding new services to or modifying existing services in such an object requires that a new interface be defined in a design-time operation. The new interface would then be distributed or promulgated for general run-time use. The new interface may inherit services from an existing interface, but the new interface remains distinct and has a unique identifier. Despite interface inheritance, therefore, interfaces remain static once they have been established, distributed, or promulgated for use at run-time.

Another aspect of some conventional interfaced software objects, such as OLE/ActiveX objects according to the component object model, is the binding of events between objects. Events provide a mechanism by which an object initiating an event can notify other objects of the event. Event binding provides interaction between objects and their interfaces that can result in greater functionality or interactivity for a user. An example of an application illustrating the benefits of event binding is an interactive virtual world environment that represents a real or imaginary place using graphic and audio data for presenting the place to a computer user and allowing the user to interact with it.

Objects with conventional interfaces and conventional event binding can be used to provide users of a virtual world environment with a predefined environment with which the user can interact. In a virtual world environment objects and their interfaces can be used to represent and control operation an interaction of various entities, objects, and places in the virtual world environment. Within this context, conventional event binding can provide a mechanism by which information about an action by one object (e.g., an avatar representing a user) in the virtual world environment can be passed or broadcast to other objects in the virtual world environment. Based upon this information, other objects in the virtual world environment can initiate other actions or methods.

For example, an announcement event could be triggered in a virtual world environment when an avatar represented by an object interface enters a new area (e.g., room) of the virtual world environment. The announcement could be a notification that is broadcast to any other users (avatars) in the area to notify them of the new arrival. Each of the other avatars in the area can have predetermined methods that are executed in response to receiving the announcement event.

The virtual reality modeling language, VRML, which is an off-shoot of the hyper-text modeling language (HTML), also includes a mechanism for handling event notifications. At a high level of abstraction, VRML is simply a file format for describing objects. The objects can contain virtually any data type—3D geometry, MIDI data, JPEG images, and so on. VRML defines a set of objects useful for doing displaying graphics, multi-media, and interactive object/world building. These objects are called nodes, and they contain events and elemental data that are stored in fields.

Most nodes have at least one eventIn definition and thus can receive events. Incoming events are data messages sent by other nodes (i.e., objects) to change some state within the receiving node. Some nodes also have eventOut definitions. These are used to send data messages to destination nodes that some state has changed within the source node.

Like the static nature of conventional interface services, conventional event binding under object models (e.g., COM) and VRML is similarly static. Objects and their interfaces under an object model and nodes under VRML are capable of responding to event notifications that correspond to events that are programmed into the interfaces or nodes when they are created. Once design and implementation of the interface or node is complete and the object or node is established, distributed, or promulgated for general run-time use, the events to which the interface or node is responsive cannot be changed.

Objects with conventional static interfaces and static event binding can be used to provide users of a virtual world environment with a predefined environment with which the user can interact. A disadvantage with objects having conventional static interfaces and static event binding in such an environment is that changes to the environment cannot be made at run-time. Changes must be made by adding interfaces in a design-time operation. This restricts the level of interaction or control that users can have with or over the environment. In some applications such as virtual world environments the lack of flexibility in interface definitions can pose an undesirable limitation.

In accordance with the present invention, therefore, a dynamic or latebound event mechanism provides event mechanism operation according to associational relationships among objects. In addition, objects may be responsive to event notification methods that are not initially within the original object definition, thereby allowing the event notification methods to be inherited by objects dynamically during run-time. This latebound event mechanism and dynamic inheritance may be provided within the context of an object model, such as the component object model, that supports only design-time interface inheritance. As applied in a virtual world environment, for example, latebound event mechanism and dynamic inheritance can provide users with increased levels of interaction or control.

In applying the latebound event mechanism of this invention to a virtual world environment, for example, the objects may correspond to the entities that would arise within the virtual world environment. Entities are the graphical beings, articles, and even space or room within the virtual world environment, as well as the underlying objects for implementing them. The objects have associational relationships primarily represent the physical or corporeal distinctions between entities.

One implementation utilizes the associations Self, Contents, Peer, and Container. The being or article entity initiating an event is its own Self relative to and separate from other entities. The associations are made relative to this Self entity. The space or room of the virtual world environment within which the Self entity is located or is one of the contents has a Contents association. Other being or article entities in the area with the Contents relationship are Peers of the Self entity. A Self entity capable of containing one or more other article entities has a Container association. While such a Container entity would also be a Peer of the other entities, it is assigned to an associational class Container to reflect its functionality.

Event notification methods are promulgated among the objects corresponding to the entities in a sequence based upon the associational relationships between the entities. For an event fired or triggered with regard to one of the entities within the virtual world environment (e.g., a Self entity with the arbitrary name FOO), an event notification method is passed to any objects contained within the FOO entity (i.e., objects for which the FOO entity is the Container) before event notification methods are promulgated to objects of other entities. An event notification method is then passed to objects within the object corresponding to the Content entity that contains the FOO entity (e.g., a room within the virtual world environment). Event notification methods are then passed successively to the objects corresponding to the FOO entity itself (i.e., the Self entity) and finally to any Peer entities of the FOO entity.

The event notification methods relating to the Container, Contents, Self, and Peer entities may be designated OnContainerFoo, OnContentsFoo, OnFoo, and OnPeerFoo, respectively, where in this case "Foo" is the name of the event. Each event notification method can have particular functionality according to the particular event and the entity receiving the notification.

This sequence of event notification methods provides propagation of events in a manner that reflects common causal sequences to improve the appearance of reality provided by the virtual world environment. Passing the first event notification method to objects contained within the entity (i.e., Container) initiating the event allows the method to be applied to any contained entity under the control of the Container entity. If methods were applied to contained entities after being applied to their Container, the later changes to contained entities could cause unpredictable or incongruous changes to the Container. For a similar reason the event notification method is passed next to the Content entity that contains the entity initiating the event. Subsequently passing event notification methods to the Self entity and the Peer entities provides an event sequence that represents the propagation of causal effects from an event and thereby provides an improved representation of a virtual world environment. This event notification may be utilized with or without dynamic inheritance.

In providing dynamic inheritance, hierarchical relationships are defined between multiple objects such that each object references or is referenced by another object. One of the objects is a root object that is referenced by at least one other object but that does not reference another object. A call is made for a particular service (e.g., an event notification method) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced whenever the service is available therefrom or the call is passed to yet another referenced object until the service can be provided. The call may be passed to multiple successive referenced objects until the call reaches the root object, which either provides the service or the service is deemed unavailable.

Another aspect of dynamic inheritance is that an object model interface may include one or more methods for adding or otherwise changing the methods or properties available from that interface. The changes in the methods or properties may be made at run-time, after the interface has been otherwise fixed or established.

In one implementation, the interface includes an AddMethod method that adds a designated method to the interface at run-time to make the method available from the interface. Similarly, the interface includes an AddProperty method that adds a designated property to a designated interface at run-time to make the property available from the interface. An InvokeMethod method allows a user to execute the designated method, and other methods can allow other access to and control over the methods and properties. Methods and properties available for implementation or access by these dynamic inheritance methods may be in a dynamic inheritance listing, such as a table, that indicates the names of the methods and properties, defines the services they provide, and includes unique identifiers for them.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
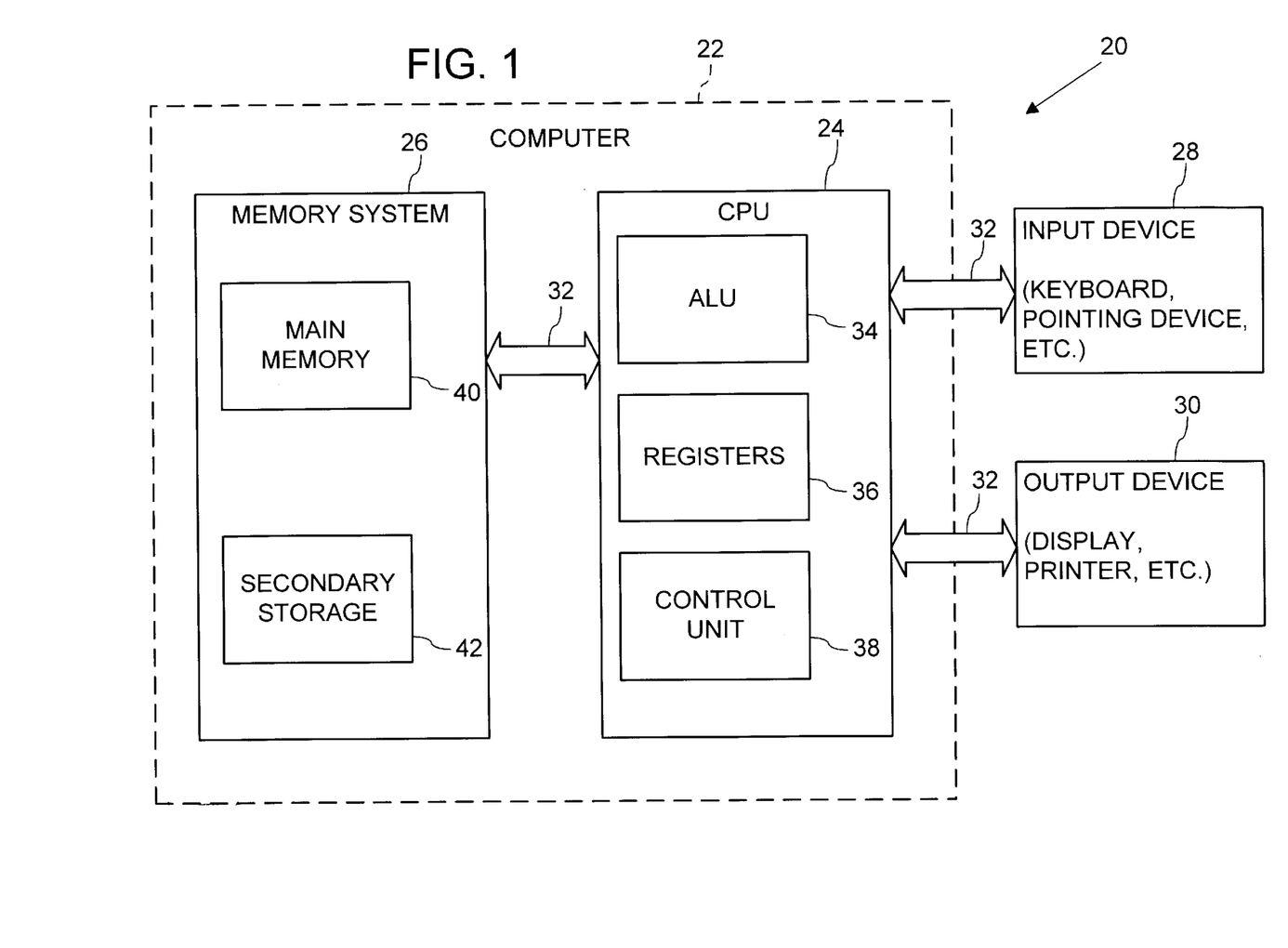
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
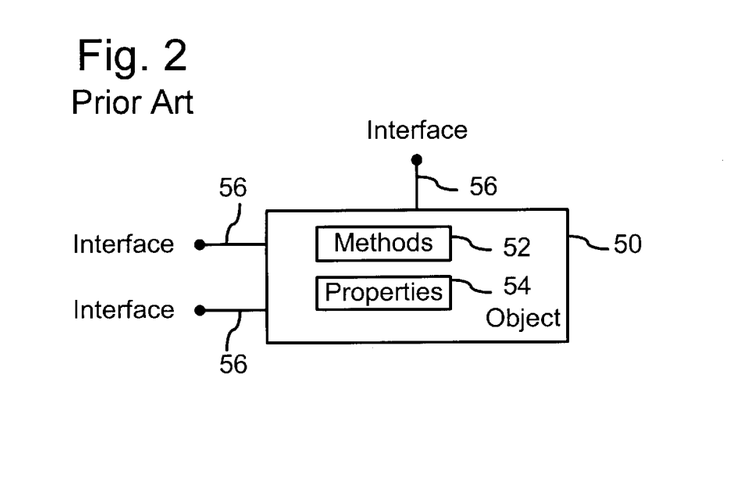
FIG. 2 is a block diagram of a prior art interfaced software object.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by software program or may be an entirely separate executable process.

Each object 50 is an instance of a specific class of related objects. Exemplary object 50 also includes the characteristics of encapsulation, polymorphism, and inheritance. Object 50 encapsulates its properties 54 so each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

And object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3A:
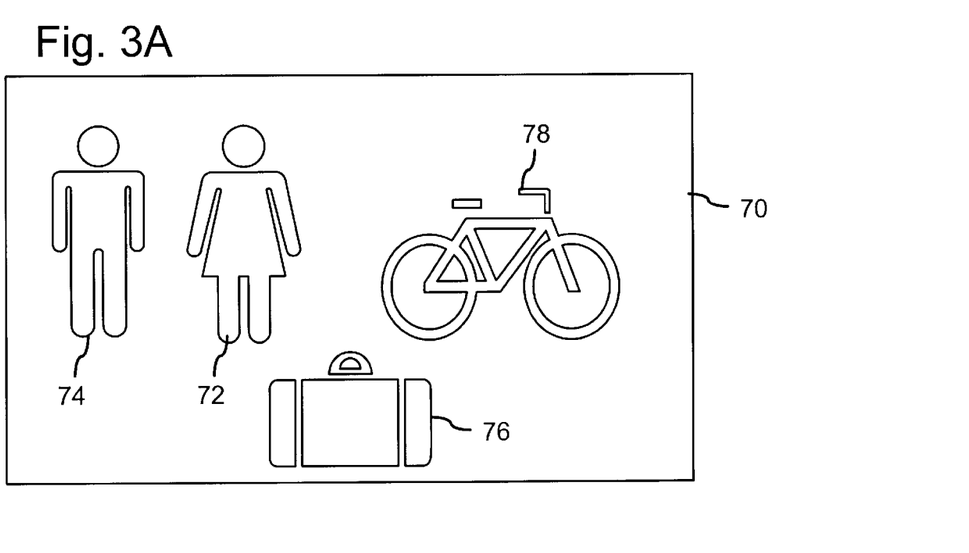
FIG. 3A is a schematic illustration of an exemplary area or space or room within a virtual world environment.

FIG. 3A is a schematic illustration of an exemplary area or space or room 70 within a virtual world environment that represents a real or imaginary place using graphic and audio data that are presented to a computer user. Room 70 may be rendered on a display (e.g., display 30) or may represent information or data held within a memory system (e.g., memory system 26). Room 70 has within it several items or entities including first and second avatars 72 and 74 that each represents a different user, a container article or artifact 76 that can hold or contain other articles or artifacts or entities (none shown), and another article or artifact 78 that is not a container for holding other entities. In this regard, entities are the graphical beings, articles, and even space or room within the virtual world environment, as well as the underlying objects and interfaces for implementing them.

Figure 3B:
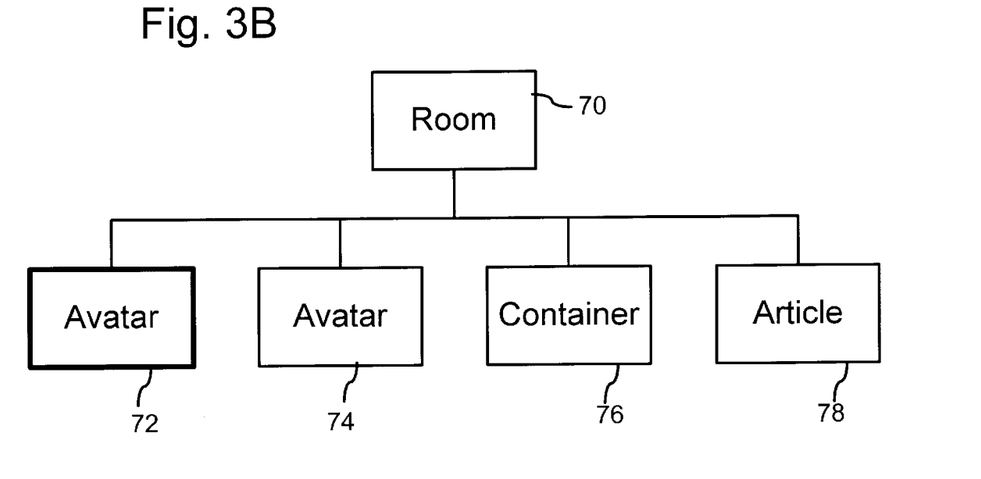
FIG. 3B is a block diagram illustrating associational relationships between entities within the virtual world environment.

FIG. 3B is a block diagram illustrating associational relationships between the virtual space or room 70 and entities 72–78. The associational relationships primarily represent the physical or corporeal distinctions between entities and order them according to the associations Self, Contents, Peer, or Container. Each of entities 72–78 is its own Self relative to and separate from other entities. Avatar 72 is shown with highlighting to illustrate its Self association, as explained below with reference to FIG. 5. Room 70 has entities 72–78 as its contents and hence has a Contents association. Avatars 72 and 74 and article 78 are Peers of each other within room 70. While entity 76 is also a peer of the other entities, it is assigned to an associational category Container because it contains one or more other entities (not shown) despite not being an area or room. FIG. 3B illustrates how entities 70–78 correspond to different classes within which a latebound event mechanism of the present invention may be applied.

The associational relationships are made with reference to the entity at which a method is initiated. With a method initiated at avatar 72, for example, avatar 72 has the Self association. Room 70 has a Content association because it contains Self avatar 72. Entities 74–78 are Peers of Self avatar 72. Self avatar 72 does not have a Container relationship, but with a method initiated at entity 76 there would be a Container relationship to the entities contained by entity 76.

Figure 4:
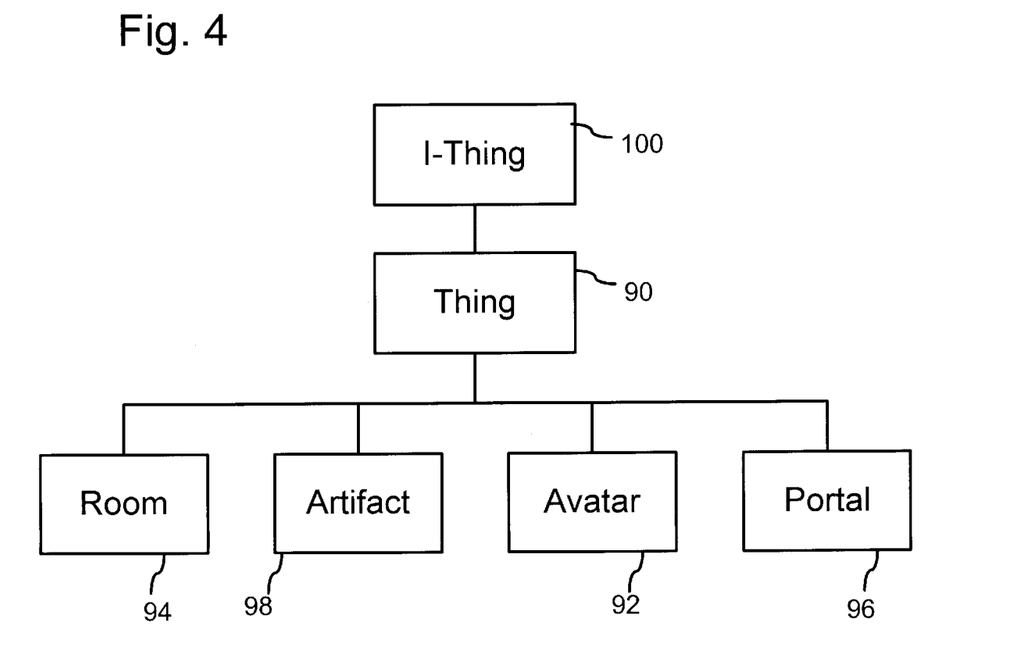
FIG. 4 is a block diagram representing hierarchical inheritance relationships between an exemplary set of objects.

With reference to FIG. 4, entities 70–78 are represented by instances of objects 90–98 of an interactive virtual world environment and correspond to particular types of entities or articles within the environment and representing abstractions that include data and the operations associated with that data. Objects 90–98 have hierarchical inheritance relationships between them that may be used to extend the latebound event mechanism, as described below in greater detail. Objects 90–98 are based upon an interface 100 (designated I-Thing) that in one implementation is a COM object interface. It will be appreciated, however, that I-Thing interface 100 could alternatively be implemented according to other object models.

Objects 90–98 are the basic objects from which other objects inherit services and are called the exemplars for the virtual world environment or representation. Object 90 (designated Thing) is the root or core of the set of all interfaces in the representation. Object 92 (designated Avatar) represents an avatar corresponding to a real person (e.g., the user) or a virtual person in the world. Object 94 (designated RoomRoom) and object 96 (designated Portal) represent and define the topology of the world as locations (i.e. rooms) and passageways (i.e., portals) between the rooms. Object 98 (designated Artifact) represents articles that are or may be manipulated by any of users via their avatars. It will be appreciated, however, that this illustration does not limit the applicability of dynamic inheritance between objects to a virtual world environment and that dynamic inheritance of this invention can be used with objects for other representations, models, or schemes.

Figure 5:
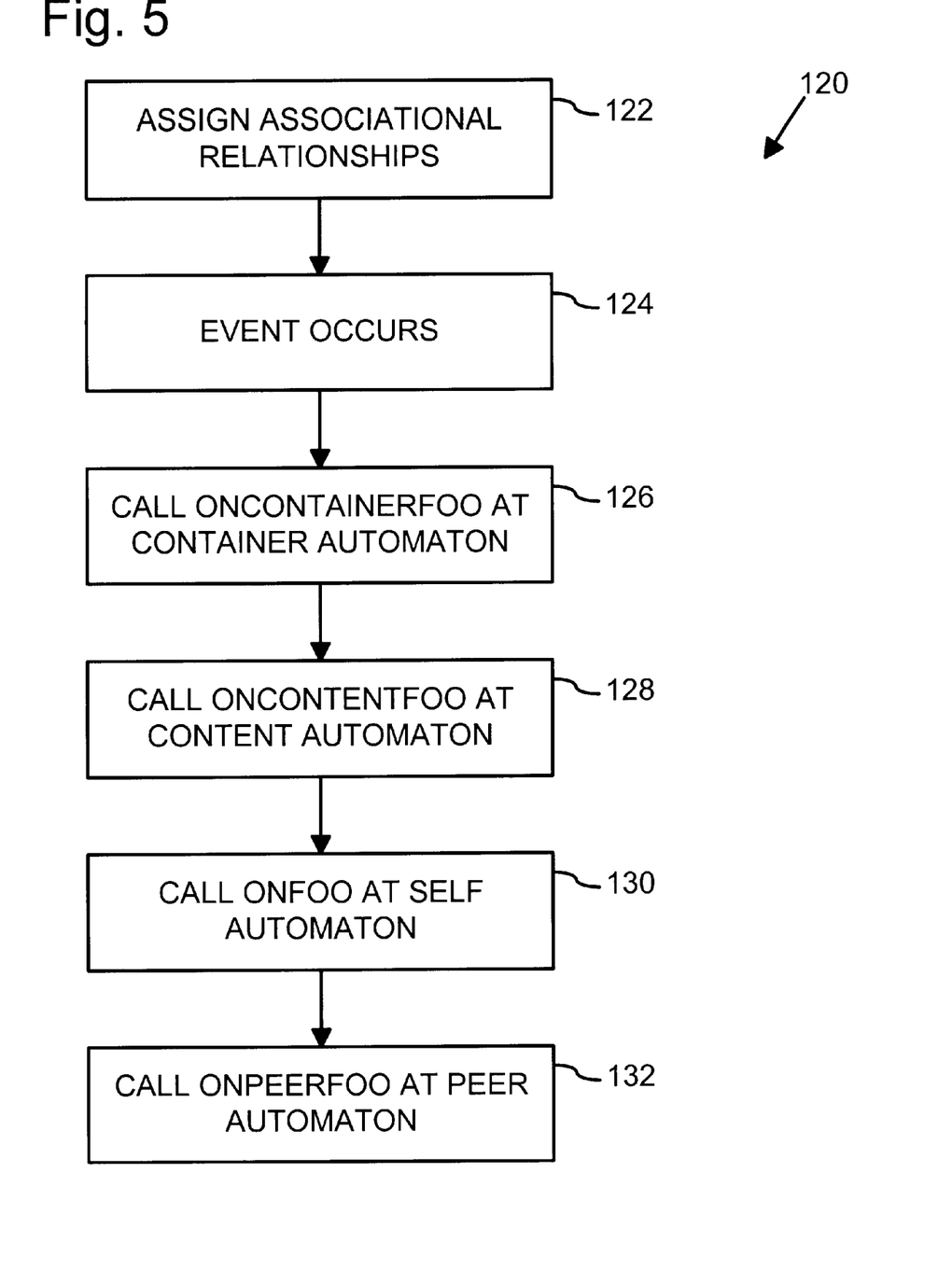
FIG. 5 is a flow diagram illustrating a latebound event mechanism process in which event notifications and associated methods may be promulgated among objects in a dynamic, run-time manner.

FIG. 5 is a flow diagram illustrating a latebound event mechanism process 120 in which event notification methods are promulgated among objects corresponding to entities 70–78 in a latebound, dynamic, run-time manner. For purposes of illustration, dynamic event mechanism process 120 is described with reference to the associational relationships shown in FIG. 3B and the hierarchical relationships shown in FIG. 4.

Process block 122 indicates that the entities and their corresponding objects within the virtual world environment are assigned associational relationships such as those shown in FIG. 3B. It will be appreciated that these relationships are illustrative and that the present invention may be applied to other associational relationships and to applications other than a virtual world environment.

Process block 124 indicates that an event occurs or is "fired" with regard to one of the entities within the space in the virtual world environment. In one implementation, a FireEvent method invoked at object 92 corresponding to avatar 72 to initiate the event. The FireEvent method passes the name of the event and any required parameters. With reference to the illustration in FIGS. 3A and 3B, for example, the event occurs with reference to avatar 72 and is a Tell event in which avatar 72 passes information or tells something to other entities in room 70. For an entity (e.g., avatar 72) with the name "Avatar 72", the Tell event would have the general format Tell(Avatar72). The FireEvent method may be executed either directly through the object (e.g., object 92) as a conventional defined object method or may be executed indirectly through a dynamic inheritance process described below in greater detail.

Process block 126 indicates that an event notification method (e.g., OnContainerFoo) is called at any object within a container entity on which the method is called, where "Foo" is the name of the event. In this example, avatar 72 is not designated a Container and so there are no objects on which to call OnContainerFoo. In applying the exemplary Tell(Avatar76) event to an entity such as entity 76, however, the OnContainerTell method is called on objects (not shown) within object 98 corresponding to entities contained within container 76. The OnContainerTell method may be executed either directly through the contained objects as a conventional defined object method or may be executed indirectly through the dynamic inheritance process described below.

If it is supported directly or indirectly, the OnContainerTell method or any other OnContainerFoo method provides a functional result at any object contained within a container entity (e.g., 76). Execution of any OnContainerFoo method prior to other event notification methods is desireable because of the potential otherwise for OnContainerFoo methods to have unpredictable results on a Container entity. In this regard, objects within container entity 76 receive early notification in recognition of their unique association with respect to container entity 76.

Process block 128 indicates that an event notification method (e.g., OnContentFoo) is called at the space or region entity within which is located the entity on which the method is called. In this example, avatar 72 is within room 70 and the OnContentTell method is called on object 94 corresponding to room 70.

The OnContentTell method may be executed either directly on object 94 as a conventional defined object method or may be executed indirectly through the dynamic inheritance process described below. If it is supported directly or indirectly, the OnContentTell method or any other OnContentFoo method provides a functional result at the room object or entity (e.g., object 94/room 70) within which is located the entity on which the method is called (e.g., avatar 72). This functional result further reflects the propagation of the causal effect of the event.

Process block 130 indicates that an event notification method (e.g., OnFoo) is called at the object of the entity for which the event is fired. In this example, the OnTell method is called at object 92 corresponding to avatar 72. The OnTell method may be executed either directly through the object (e.g., object 92) as a conventional defined object method or may be executed indirectly through a dynamic inheritance process described below.

If it is supported directly or indirectly, the OnTell method or any other OnFoo method provides a functional result at the "acting" entity 72 with which the triggering event (e.g., Tell) is associated. Providing the first event notification method at Self entity 72 provides an initial causal effect to be associated with the entity that the event is associated with.

Process block 132 indicates that an event notification method (e.g., OnPeerFoo) is called at the object of any other entity that is also contained in the space entity that contains the entity for which the event is fired. In this example, avatar 74 and articles 76 and 78 are in room 70 with, and hence peers of, avatar 72. The OnPeerTell method is called on the interface objects 92 and 98 corresponding to avatar 74 and articles 78 and 76.

The OnPeerTell method may be executed either directly through the object or objects (e.g., objects 92 and 98) as a conventional defined object method or may be executed indirectly through the dynamic inheritance process described below. If it is supported directly or indirectly, the OnPeerTell method or any other OnPeerFoo method provides functional results at the entities other than room 70 and self entity 72. These functional results reflect the conclusion of the propagation of the causal effect of the event throughout room 70.

Event mechanism process 120 provides notifications of events among objects according to their associational relationships. The OnFoo method at process block 130 represents a "first person" or "actor" event notification method that is called at an object corresponding to the entity with which an event is associated. The OnContainerFoo method at process block 126 represents an event notification at an entity contained by the actor entity with which the event is associated. The OnContentFoo method at process block 128 represents an area event notification at an entity containing the entity with which the event is associated. The OnPeerFoo method at process block 132 represents the final propagation of an event notification through an associated set of entities. This event notification sequence represents the propagation of causal effects from an event and thereby provides an improved representation of a virtual world environment.

Event mechanism process 120 of FIG. 5 has been described as utilizing a dynamic inheritance process, which is described below. It will be appreciated, however, that utilizing the dynamic inheritance process in connection with event mechanism process 120 is but one implementation of this invention. In a alternative implementation, for example, event mechanism process 120 could be utilized with the dynamic inheritance process.

Figure 6:
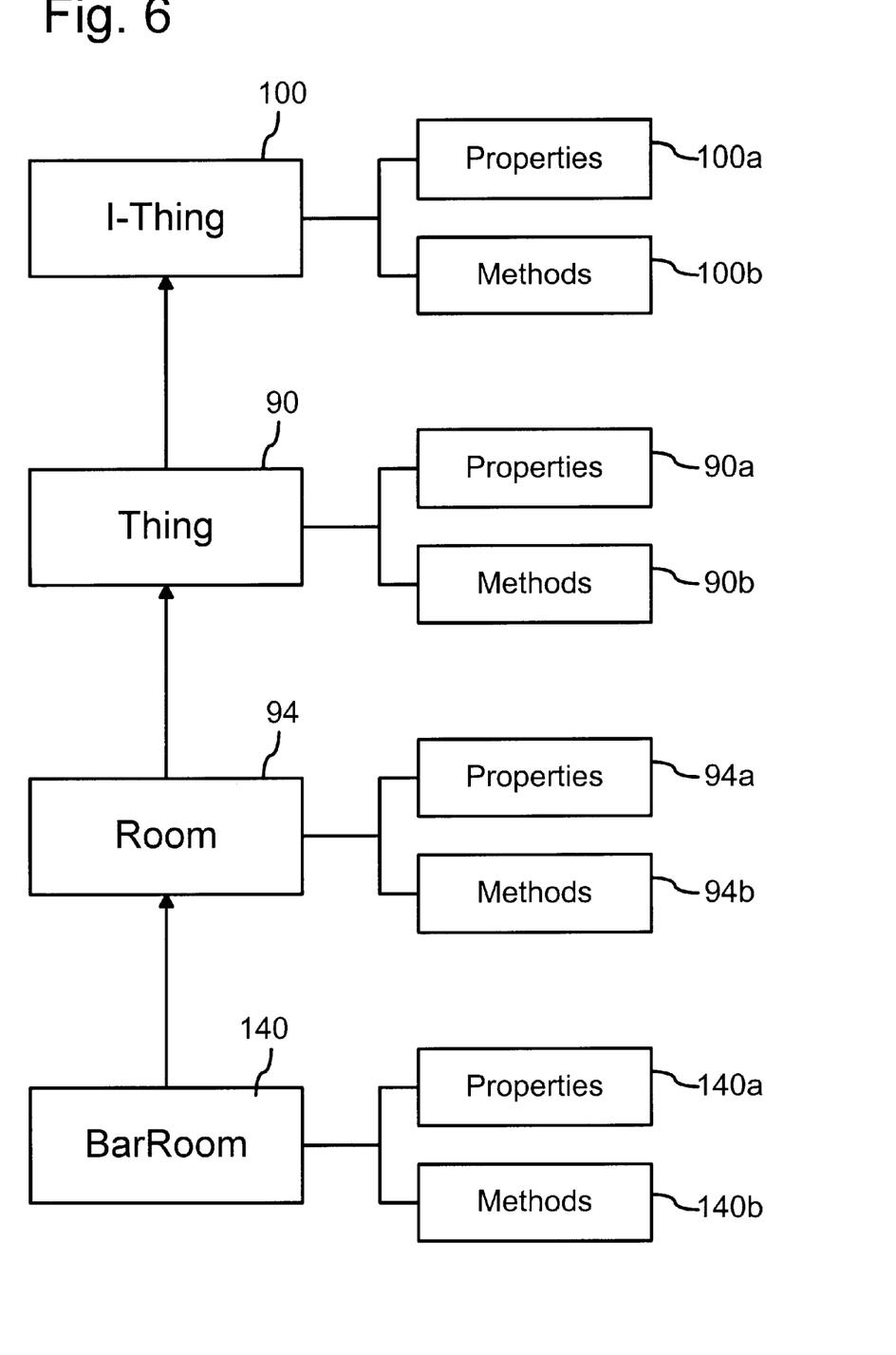
FIG. 6 is a block diagram illustrating a sequence of hierarchical inheritance relationships.

FIG. 6 is block diagram illustrating a sequence of hierarchical inheritance relationships between I-Thing interface 100 and exemplar Thing object 90, exemplar Room object 94, and one example of a particular room object 140 designated BarRoom. Objects 90, 94, and 140 include the characteristics described with reference to interfaces 56 of object 50 which characteristics are represented as properties 90*a*, 94*a*, and 140*a* and methods 90*b*, 94*b*, and 140*b*, respectively. Thing object 90 is the root or parent exemplar of the set of objects and is the direct exemplar to Room object 92. Room object 92 is the direct exemplar to I-BarRoom object 140, which represents a particular room in the virtual world environment.

I-Thing interface 100 defines properties 100*a* and methods 100*b*, as described below in greater detail, that are available to all objects 90–98 and 140. Thing object 90 defines properties 90*a* and methods 90*b* shared by all other objects in the representation or virtual world environment, including exemplars 92–98 and particular object 140. Properties 90*a* include for a particular object an exemplar property that refers to the exemplar or parent of the particular object, a name property that lists the name of the particular object, and a description property that includes a text description of the particular object.

Properties 90*a* also include a geometry property that associates a geometric model for representing the object, a location property that defines a location object in the virtual world environment with or in which the particular object is positioned, a contents property that lists objects "contained" by the particular object, and an owner property that identifies a user that the "owns" the particular object.

As utilized in the exemplary virtual world environment, methods 90*b* include a MoveTo method for changing the room the particular object is in and a Tell method by which one object passes information to another. It will be appreciated, however, that other methods particular to a virtual world environment could be included in methods 90*b* and that different applications could use entirely different methods.

Room object 94 defines additional properties 94*a* and methods 94*b* shared by lower level objects in the virtual world environment, including object 140. Properties 94*a* include for a particular object an exit property indicating an exit from the room and an entrance property indicating an entrance into the room. Methods 94*b* include an announce method for broadcasting information to others in the room. I-BarRoom object 140 defines properties 140*a* and methods 140*b*, including a bartender property designating an avatar for hosting the room, a recipes property designating refreshments available in the room, an orderdrink method by which a user requests a refreshment from the bartender, and a requestmusic method by which a user requests a music selection.

Properties and methods are associated with object interfaces during a design time phase when a developer creates them. The interfaces of objects defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

Figure 7:
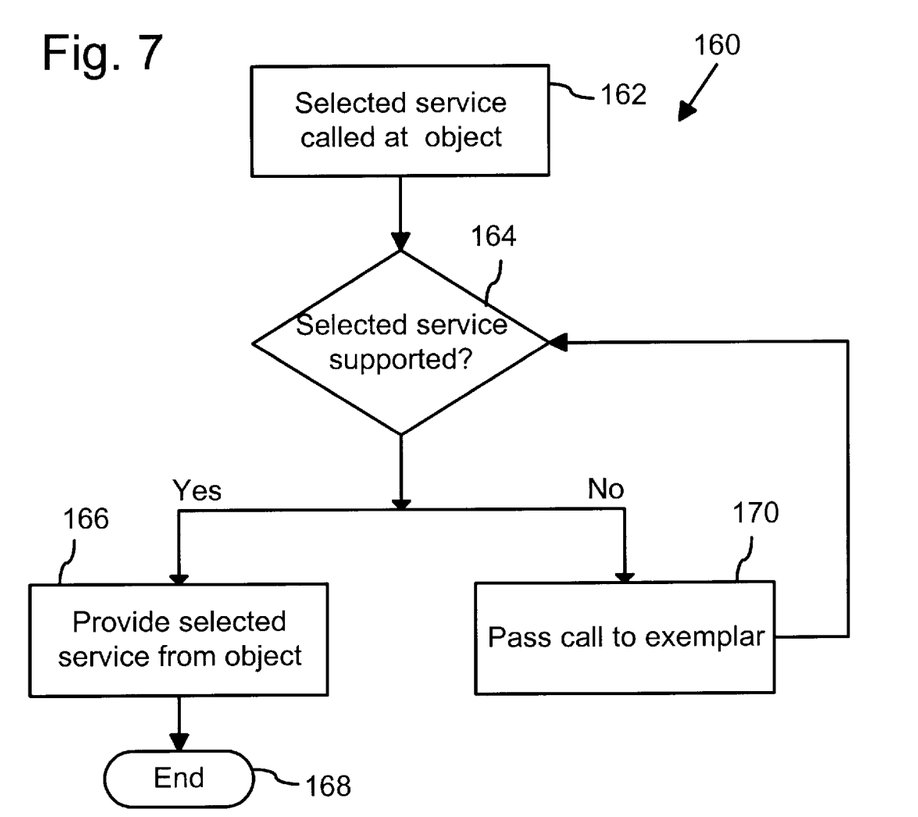
FIG. 7 is a flow diagram illustrating a hierarchical inheritance process.

FIG. 7 is a flow diagram illustrating a dynamic inheritance process 160 as a run-time use of objects. For purposes of illustration, dynamic inheritance process 160 is described with reference to the sequence of hierarchical inheritance relationships shown in FIG. 4.

Process block 162 indicates that a reference or call is made to a selected service (e.g., a property or a method) at a selected object (e.g., object 140), thereby making the selected object the current object. The reference or call may be made in the conventional manner that properties and methods of an object are referred to or called.

Query block 164 represents a query as to whether the current object receiving the reference or call (e.g., object 140) supports the selected property or method. Whenever the current object (e.g., object 140) supports the selected property or method, query block proceeds to process block 166. Otherwise, query block 164 proceeds to process block 170.

Process block 166 indicates that the selected property or method is provided by the current object. Process block 166 proceeds to termination block 168.

Process block 170 indicates that the reference or call to the selected property or method is passed to the direct exemplar of the current object (e.g., object 94) and the direct exemplar is redesignated the current object. Process block 170 returns to query block 164.

Process 160 provides a mechanism for dispatching properties and methods to exemplars. Process 160 supports dynamic inheritance of other properties and methods at run-time by allowing intervening exemplars to be added to a hierarchy of objects.

In one implementation I-Thing interface 100 also defines, supports, or implements methods 100b that include the dynamic inheritance methods set forth in Table 1. Methods 100b in Table 1 are available to each object of which I-Thing interface 100 is the root exemplar (e.g., objects 92–98 and 140).

TABLE 1

| Name | Action |
| --- | --- |
| AddMethod | Adds a designated method to make the method available to the object |
| RemoveMethod | Removes a designated method to make the method unavailable to the object |
| AddProperty | Adds a designated property to make the property available from the object |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method |
| PutProperty | Puts a designated value or designated values in the parameters of a designated property |
| InvokeMethod | Invokes a designated method |

For example, methods and properties available for implementation or access by the dynamic inheritance methods of I-Thing interface 100 are in a dynamic inheritance listing, such as a table, that indicates the names of the methods and properties, defines the services they provide, and includes unique identifiers for them. The unique identifiers may be of the form of integer values like the dispatch identifiers (DISPIDs) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method. The GetMethod and the GetProperty methods return the designated method and property, respectively, from the dynamic inheritance listing. The PutMethod and the PutProperty methods allow a user to set the method or property.

The dynamic inheritance methods of Table 1, as well as the dynamic inheritance process 160 of FIG. 5, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular interface or object according to dynamic inheritance process 160. In addition, methods and properties may be added by adding them to the set of methods and properties available at an exemplar, such as the root exemplar I-Thing.

These features allow inheritance to be dynamic and provide a seamless scripting environment in programmable applications like virtual world environments. Moreover, the dynamic inheritance methods of Table 1 and dynamic inheritance process 160 of FIG. 5 may be used together as described hereinabove, or either may be used alone to provide dynamic inheritance functionality.

The dynamic inheritance method InvokeMethod is similar to the Invoke method of the IDispatch interface used in COM automation. The IDispatch::Invoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 100 after it has been established is a major improvement upon the prior functionality of objects with fixed interfaces (e.g., COM objects) like the IDispatch interface.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, all such embodiments as may come within the scope and spirit of the following claims and equivalents thereto.

What is claimed is:

1. In a computer-readable medium having stored thereon software objects that have services including one or more methods and properties and that correspond to entities having corporeal relationships within a virtual world environment, the improvement comprising:

indications of associational relationships between the entities representing corporeal distinctions between the entities within the virtual world environment, the associational relationships between the entities including Self and Contents relationships and the associational relationships including an enveloping relationship for at least one of the objects in which relationship the object is enveloped by at least one enveloping entity; and software instructions for promulgating event notification methods among the objects corresponding to the entities in a sequence based upon the associational relationships between the entities.

2. The computer-readable medium of claim 1 further comprising software instructions for promulgating an event notification method to the object corresponding to the enveloped entity before event notification methods are promulgated to objects with other associational relationships.

3. The computer-readable medium of claim 1 in which the enveloping entity corresponds to a region in the virtual world environment and the enveloping relationship corresponds to a Content relationship.

4. The computer-readable medium of claim 1 in which the enveloping entity corresponds to an entity in the virtual world environment and the enveloping relationship corresponds to a Container relationship.

5. In a computer-readable medium having stored thereon software objects that have services including one or more methods and properties and that correspond to entities having corporeal relationships within a virtual world environment, the improvement comprising:

indications of associational relationships between the entities representing corporeal distinctions between the entities within the virtual world environment, the associational relationships between the entities including Self and Contents relationships;

software instructions for promulgating event notification methods among the objects corresponding to the entities in a sequence based upon the associational relationships between the entities; and software instructions for firing an event with regard to one of the entities within the virtual world environment and designating the one of the entities with the Self relationship.

6. The computer-readable medium of claim 5 further comprising software instructions for promulgating an event notification method to the object corresponding to the Self entity after event notification methods are promulgated to objects of entities with enveloping relationships.

7. In a computer-readable medium having stored thereon software objects that have services including one or more methods and properties and that correspond to entities having corporeal relationships within a virtual world environment, the improvement comprising:

indications of associational relationships between the entities representing corporeal distinctions between the entities within the virtual world environment, the associational relationships between the entities including Self, Contents and Peer relationships; and software instructions for promulgating event notification methods among the objects corresponding to the entities in a sequence based upon the associational relationships between the entities.

8. The computer-readable medium of claim 7 further comprising software instructions for promulgating an event notification method to the object corresponding to the Self entity before event notification methods are promulgated to objects of entities with the Peer relationship.

9. The computer-readable medium of claim 8 further comprising software instructions for promulgating event notification methods successively to the objects corresponding to the Self and Peer relationships.

10. In a computer-readable medium having stored thereon software objects that have services including one or more methods and properties and that correspond to entities having corporeal relationships within a virtual world environment, the improvement comprising:

indications of associational relationships between the entities representing corporeal distinctions between the entities within the virtual world environment;

indications of hierarchical relationships between the objects such that each object references or is referenced by another object;

software instructions for promulgating event notifications methods among the objects corresponding to the entities in a sequence based upon the associational relationships between the entities;

software instructions for determining in response to a call to an event notification method at a selected object whether the selected event notification method is available from the object;

software instructions for passing the call to a referenced object that is referenced by the selected object if the selected event notification method is unavailable at the selected object;

software instructions for determining in response to a call to the selected event notification method passed to a referenced object whether the selected service is available from the referenced object; and software instructions for passing the call to successive other referenced objects if the selected event notification method is unavailable at one or more previously referenced objects.

11. In a computer-readable medium having stored thereon software objects that have services including one or more methods and properties and that correspond to entities having corporeal relationships within a virtual world environment, the improvement comprising:

indications of associational relationships between the entities representing corporeal distinctions between the entities within the virtual world environment, the associational relationships between the entities including Self and Contents relationships;

indications of hierarchical relationships between the objects such that each object references or is referenced by another object;

software instructions for promulgating event notifications methods among the objects corresponding to the entities in a sequence based upon the associational relationships between the entities;

software instructions for determining in response to a call to an event notification method at a selected object whether the selected event notification method is available from the object; and software instructions for passing the call to a referenced object that is referenced by the selected object if the selected event notification method is unavailable at the selected object.

12. The computer-readable medium of claim 11 further comprising software instructions for firing an event with regard to one of the entities within the virtual world environment and designating the one of the entities with the Self relationship.

13. The computer-readable medium of claim 12 further comprising software instructions for promulgating an event notification method to the object corresponding to the Self entity after event notification methods are promulgated to objects of entities with the Contents relationship.

14. The computer-readable medium of claim 11 in which the indications of associational relationships between the entities include a Peer relationship.

15. The computer-readable medium of claim 14 further comprising software instructions for promulgating an event notification method to the object corresponding to the Self entity before event notification methods are promulgated to objects of entities with the Peer relationship.

16. The computer-readable medium of claim 15 further comprising software instructions for promulgating event notification methods successively to the objects corresponding to the Self and Peer relationships.

17. In an interfaced software object stored on a computer-readable medium and corresponding to one of plural entities in a virtual world environment, the improvement comprising:

an event notification method provided through the object according to an associational relationship between the one entity and the other entities, the one entity representing an acting entity in the virtual world environment with respect to which a given event arises and the one entity having a Self associational relationship to the occurrence of the event.

18. In an interfaced software object stored on a computer-readable medium and corresponding to one of plural entities in a virtual world environment, the improvement comprising:

an event notification method provided through the object according to an associational relationship between the one entity and the other entities, the one entity representing an area entity within which a given event arises and the one entity having a Room associational relationship to the occurrence of the event.

19. In an interfaced software object stored on a computer-readable medium and corresponding to one of plural entities in a virtual world environment, the improvement comprising:

an event notification method provided through the object according to an associational relationship between the one entity and the other entities, the one entity representing an entity in the virtual world environment area where a given event arises, the given event not arising with respect to the entity, and the one entity having a Peer associational relationship to the occurrence of the event.

20. In an interfaced software object stored on a computer-readable medium and corresponding to one of plural entities in a virtual world environment, the improvement comprising:

an event notification method provided through the object according to an associational relationship between the one entity and the other entities, the one entity representing an entity in the virtual world environment area where a given event arises, the given event not arising with respect to the entity, the entity including functionaility to contain another entity, and the one entity having a Container associational relationship to the occurrence of the event.

21. In an interfaced software object stored on a computer-readable medium and corresponding to one of plural entities in a virtual world environment, the improvement comprising:

an event notification method provided through the object according to an associational relationship between the one entity and the other entities, the event notification method being provided indirectly through the object.

22. The object of claim 21 in which the event notification method is provided indirectly through the object by a dynamic inheritance method.

23. In a computer system utilizing software objects that have services including one or more methods and properties and that correspond to entities having corporeal relationships within a virtual world environment, the improvement comprising:

providing indications of associational relationships between the entities representing corporeal distinctions between the entities within the virtual world environment, the associational relationships between the entities including Self and Contents relationships;

promulgating event notification methods among the objects corresponding to the entities in a sequence based upon the associational relationships between the entities; and firing an event with regard to one of the entities within the virtual world environment and designating the one of the entities with the Self relationship.

24. The system of claim 23 further comprising promulgating an event notification method to the object corresponding to the Self entity after event notification methods are promulgated to objects of entities with the Contents relationship.

25. The system of claim 23 in which the indications of associational relationships between the entities include a Peer relationship.

26. The system of claim 25 further comprising promulgating an event notification method to the object corresponding to the Self entity before event notification methods are promulgated to objects of entities with the Peer relationship.

27. The system of claim 26 further comprising promulgating event notification methods successively to the objects corresponding to the Self and Peer relationships.

28. In a computer-readable medium having stored thereon software objects that have services including one or more methods and properties and that correspond to entities having corporeal relationships within a virtual world environment, the improvement comprising:

indications of associational relationships between the entities representing corporeal distinctions between the entities within the virtual world environment, the associational relationships between the entities including Container, Content, Peer, and Self relationships; and software instructions for promulgating event notification methods among the objects corresponding to the entities in a sequence based upon the associational relationships between the entities.

29. The computer-readable medium of claim 28 further comprising software instructions for promulgating an event notification method to objects corresponding to entities with the Container and Content relationships before event notification methods are promulgated to objects with other associational relationships.

30. The computer-readable medium of claim 29 further comprising software instructions for promulgating event notification methods successively to the objects corresponding to the Self and Peer relationships.

31. The computer-readable medium of claim 28 further comprising software instructions for promulgating an event notification method to the object corresponding to the Self entity before event notification methods are promulgated to objects of entities with the Peer relationship.

* * * * *